United States Patent [19]

Arrighetti et al.

[11] 4,145,378

[45] Mar. 20, 1979

[54] METHOD FOR THE PREPARATION OF NOVEL THERMOPLASTIC MATERIALS, AND PRODUCTS OBTAINED THEREBY

[75] Inventors: Sergio Arrighetti, Milan; Aldo Brancaccio, Cremona; Sebastiano Cesca; Giampaolo Giuliani, both of San Donato Milanese (Milan), all of Italy

[73] Assignee: Anic S.p.A., Palermo, Italy

[21] Appl. No.: 784,786

[22] Filed: Apr. 5, 1977

[30] Foreign Application Priority Data

Apr. 22, 1976 [IT] Italy ................ 22543 A/76

[51] Int. Cl.² ............... C08F 255/00; C08F 255/02; C08F 255/04; C08F 255/08

[52] U.S. Cl. .............. 260/876 R; 260/878 R; 260/897 B

[58] Field of Search ............ 260/878 R, 876 R, 897 B

[56] References Cited

U.S. PATENT DOCUMENTS

| | | | |
|---|---|---|---|
| 3,312,757 | 4/1967 | McRitchie | 260/878 R |
| 3,446,760 | 5/1969 | Nowak et al. | 260/878 R |
| 3,456,038 | 7/1969 | Newman et al. | 260/878 R |
| 3,522,222 | 7/1970 | Taylor | 260/878 R |
| 3,538,190 | 11/1970 | Meredith et al. | 260/878 R |
| 3,538,191 | 11/1970 | Meredith et al. | 260/878 R |
| 3,849,518 | 11/1974 | Severini et al. | 260/878 R |
| 3,876,730 | 4/1975 | Morimoto et al. | 260/878 R |
| 3,893,968 | 7/1975 | Shiga et al. | 260/878 R |
| 3,904,709 | 9/1975 | Morimoto et al. | 260/878 R |
| 3,984,496 | 10/1976 | Morimoto et al. | 260/878 R |
| 4,001,349 | 1/1977 | Severini et al. | 260/878 R |
| 4,020,022 | 4/1977 | Biglione et al. | 260/878 R |

Primary Examiner—Alan Holler
Attorney, Agent, or Firm—Morgan, Finnegan, Pine, Foley & Lee

[57] ABSTRACT

Novel thermoplastic materials can be obtained in which besides the resin formed by polymerizing alkenylaromatic with or without acrylic and vinylic monomers, there is also a branched interpolymer the main carbon atom chain of which has a saturated elastomeric nature, whereas the chains which make up the branch-offs have a plastic character. Side-chains on the saturated rubber, which have the same composition as the non-grafted resin, favors the even dispersion of the rubber in the resin matrix so that the physical and mechanical properties of the resin are considerably improved: an improved resistance to ageing is also achieved. A styrene-acrylonitrile resin grafted on a saturated ethylene-propylene copolymer is but an example. The preparation process is carried out in solution: critical conditions, additives, adjuvants, initiators and promoters are indicated and exemplified. Irradiation with ultraviolet rays may be of help.

13 Claims, No Drawings

METHOD FOR THE PREPARATION OF NOVEL THERMOPLASTIC MATERIALS, AND PRODUCTS OBTAINED THEREBY

This invention relates to the preparation of novel thermoplastic materials which are characterized by a high resistance to aging and contain a totally saturated elastomeric substrate. Thermoplastic materials thus obtained are also a subject-matter of this invention.

More particularly, the thermoplastic materials which are the subject-matter of this invention are composed of a resin which is obtained by polymerization of one or more monomers selected from those indicated hereinafter, and by a saturated elastomeric polymer grafted with resins obtained from the polymerization of the same monomers. The materials of this invention are obtained by a method which provides for the polymerization of the monomers of interest and their simultaneous grafting onto the elastomeric substrate, in the presence of appropriate radical initiators.

It is known that the thermoplastic materials as commonly available in the trade are obtained by grafting onto polybutadiene or polyisoprene monomers or admixtures of two or more monomers from those mentioned above, but they have the defect that they become brittle by the action of air and sunlight.

A typical example of resins of the kind referred to above, which embrittle rapidly under the action of weathering agents, are the so-called ABS-resins: these are produced by polymerizing with different methods an appropriate mixture of styrene and acrylonitrile in the presence of polybutadiene which is grafted by a portion of the as-formed styrene-acrylonitrile resin.

An alternative example of thermoplastic materials of the kind referred to above and which are easily deteriorated are the so-called MBS-resins which are obtained by polymerizing a mixture of styrene and methylmethacrylate in the presence of polybutadiene which is grafted by a portion of the as-formed resin.

It is known that such an aging proneness can be reduced by employing, as the elastomeric phase, rubbers having a lower contents of unsaturations, of the kind EPDM (British Pat. Nos. 1,103,438 and 1,067,810). In the particular case of the shock-resistant resins, this is obtained by interpolymerizing styrene and acrylonitrile in the elastomer with various methods and procedures such as emulsion, suspension, solution and others (U.S. Pat. Nos. 3,538,192 and 3,538,193).

An additional improvement of the aging resistance of shock-resistant resins has been achieved by using as the elastomeric matrix a particular class of rubbery terpolymers based on ethylene and propylene and a polyene which contains a conjugated double-bond system.

The use of such terpolymers (EPTM), which makes it possible for high grafting efficiencies to be obtained while operating with extremely low levels of termonomer in the rubber, has been claimed in the U.S. patent application Ser. No. 519.799 filed on Oct. 31, 1974, now U.S. Pat. No. 3,966,844.

By means of such terpolymers (EPTM), thermoplastics materials are produced, which are endowed with extremely good anti-shock properties and have a resistance to aging which is definitely higher than that obtainable with any like material which has been produced with elastomers other than the EPTMs.

However, no method is known, unless it is carried out under rather drastic conditions, which is based on the use of completely saturated materials: it is well known, in fact, that the saturated chains exhibit a high inertia against the reaction with radical initiators.

We have now surprisingly found that it is possible to carry out, in a simple and cheap manner, radicalization reactions of completely saturated rubbers and the consequential grafting of the monomers referred to above.

According to the method which is the subject-matter of the present invention, thermoplastic materials are obtained in which, besides the resin as formed by polymerization of the alkenylaromatic and/or acrylic and-/or vinylic monomers, a branched interpolymer is present, the main chain of which has a saturated elastomeric character, whereas the chains which make up the branch-offs have a plastic character.

The presence, on the saturated rubber, of side chains having the same composition as that of the non-grafted resin, encourages an even dispersion of the rubber itself in the resinous matrix and makes it possible to overcome the discontinuity which would otherwise be present at the point of contact between the surface of the rubbery phase and the surface of the resinous phase. By so doing, the physical specifications of the material are considerably exalted and so they remain even after extremely long periods of time, when similar materials, but produced starting from unsaturated rubbers, would have lost long since their inherent properties under the influence of aging caused by weathering agents.

According to the method of this invention, to be described hereinafter, it is possible to synthesize thermoplastic materials which contain entirely saturated elastomeric polymers grafted with resins, by resorting to special procedures in carrying out the grafting reaction and employing special radical initiators which are responsible for the grafting reactions of rigid chains onto elastomeric matrices.

The method according to this invention is carried out in solution, since both the elastomeric phase and the vinyl and/or acrylic and/or vinylaromatic monomerides and the like are previously dissolved in a solvent medium and the reaction is primed in a homogeneous phase by addition of the radical generator and by heating. The presence of the solvent ensures more uniform reaction conditions, both because it prevents local overheating such as those which could occur, for example, in mass processes, and because the distribution of the chains of grafted resin on the rubber is more regular than that which would be obtained with other methods since there are no localized concentration gradients of the various reactants.

By so doing, it is also possible to carry out the grafting reaction by enhancing to the utmost the reactivity of the saturated elastomeric phase in the grafting reaction, thus offsetting the homo- and co-polymerization reactions of the monomers. This result is achieved by operating at concentrations of the monomers which are extremely low as compared with the concentration of the saturated rubber to be grafted.

The presence of the solvent affords the opportunity of stirring the viscous reaction mass even at very low concentrations of the monomers; which prevents, as outlined above, localized temperature rise from occurring, such as could be experienced, for example, the points of contact with the reactor walls or, worst of all, within the reaction mass itself due to the reaction heat build-up which could not be dissipated on account of the very high viscosity of the medium.

Thus, the solvent also fulfils the task of a thermostating agent in controlling the temperature, the latter being kept constant to the desired values at each and every point of the reaction throughout.

By so doing, it is possible to exploit to the utmost the very low reactivity of the saturated polymeric substrate in such a way as to obtain thermoplastic materials having satisfactory physical specifications: as a matter of fact, on account of the very low concentration of the monomers which are present, the saturated polymeric substrate reacts, at the outset, with the radical initiators and, subsequently, with the monomers to be grafted.

Parameters such as the reaction time, the temperature and the ratios of the concentrations of the monomers to that of the saturated rubber play a leading role when carrying out the grafting reaction: the latter is to be so piloted, by appropriately varying such parameters, as to obtain thermoplastic materials having the desired specifications.

By varying the above enumerated reaction parameters and the kind of monomers introduced in the reaction, it is possible to obtain quite a wide range of thermoplastic products which differ from one another both as to the kind of resin and as to the physical specifications. Such products range from the well known shock-resistant resins to adhesives, and to paints having an improved adhesiveness to the substrates they have to cover and others.

As outlined above, the reaction is carried out in solutions of the elastomeric material in an organic solvent or a mixture of two or more solvents and with a quantity of monomers which is very low as compared with that of the rubber. Generally, one starts from a weight ratio of the monomers to the rubber which is less than one and is preferably below 0.5.

The grafting reaction is primed by adding the radical catalyst and heating to the temperature which has been selected for the synthesis of the expected material.

As the reaction proceeds, a part of the monomers is used up in the grafting reactions and in the homo- and co-polymerization reactions: the reacted monomers are continually made up by adding fresh monomers to the reaction mass in such an amount as to maintain the weight ratio of the monomerides to the rubber still low.

As the grafting and monomer polymerization reactions go farhetr, the reaction mass grows more and more viscous, so that it becomes necessary, with the lapse of time, to add to the reaction mass evergrowing solvent volumes.

To have selected the solution process makes it possible to work with an extremely high versatility, both as regards the selection of the parameters and the feeds of the solvents and the monomers which are differentiated as the reaction time lapses.

As a matter of fact, when operating at comparatively high temperatures, the reactivity of the saturated rubber relatively to the catalyst is increased and thus also relatively to the monomers to be grafted and also the velocity of the conversion to resin is increased. In this case, the fractions of monomers which are gradually added to the reaction mass can be increased and the times, both those of the incremental addition of the monomers and the total reaction times, can be shortened.

To operate at comparatively high temperatures means also to decrease the viscosity of the reaction medium, so that both the initial quantity of the solvent and that which is incrementally added in time can be decreased. The decrease of the overall quantity of the solvent which has been made possible by the comparatively high temperature, partially allows for the increase of the transfer reactions with the same solvent as caused by the temperature: thus, as the reaction temperature is increased, no undesirable breakdown of the molecular weights of the as-produced thermoplastic materials is experienced, that which would imply, as a result, a decay of their physical specifications.

If, conversely, it is desirable that the molecular weights of the as-produced materials are comparatively low, it is sufficient to raise the temperature, and/or the quantity of the solvent, and also to vary the concentrations of the monomers used.

Comparatively high temperatures are required, for example, for certain types of modified resins to be synthesized as described herein and used, after having been dissolved in appropriate solvents, as protective varnishes having a high adhesiveness.

By working at comparatively low temperatures, in the case in which it is desirable to obtain materials having a high molecular weight, it should be borne in mind that the reactivity of the polymeric substrate relative to the catalyst and the monomers is decreased, so that it becomes necessary, just to exploit suh a reactivity to the utmost, further to diminish the monomer to rubber ratio as well as the incrementally added monomer quantities. The result is, for the reasons explained above (satisfactory heat exchange, stirring the reaction mass, absence of spatial temperature differentials and others) that the quantity of the fed-in solvent must be increased.

The foregoing considerations show that the flexibility of the method disclosed in piloting the synthesis reaction in the desired direction is such as to make it possible for the most widely different termoplastics materials to be manufactured.

An object of the present invention is thus to provide a method for the production of thermoplastic resins obtained by polymerizing, in the presence of solution of saturated rubbers, monomers having a vinyl character monomers or more specifically, vinyl and/or alkenyl aromatic character monomers, as well as acrylic monomers, their esters, amides, nitriles and also halogenic derivatives and halides of the monomers aforementioned, and also mixtures of two or more of the above enumerated monomers.

This invention also embraces in its scope the materials as produced by partial grafting, or total grafting, of the above enumerated monomers on saturated rubbers, for example rubbers of the ethylene-propylene type and/or their higher homologs.

The solvents to be used in the synthesis of the thermoplastic materials which have been modified by grafting onto saturated polymers according to the method of this invention are those liquid hydrocarbons which, either alone or in any admixture with each other are not reactive towards the monomers introduced in the reaction.

Such hydrocarbons may be of an aliphatic nature, both linear and cyclic and also of an aromatic or naphthenic type or also of a mixed character such as alkylaromatic hydrocarbons or alkyl- or aryl-naphthenic hydrocarbons.

Solvents which are particularly adapted for use in the case of the synthesis of the antishock resins are, in addition, all the commercially available hydrocarbonaceous mixtures such as petroleum ethers, mineral oils, those mixtures of aromatics which are commercially called "xylene solvents" as well as the mixtures which are marketed under the name of naphtha.

Solvents having a polar nature can furthermore be used, such as aliphatic ketones and cycloaliphatic ketones, such as methylpropylketone, cyclohexanone, and also those having a mixed character such as acetophenone, ethers, esters and halogenated hydrocarbons such as dichloroethane, chlorobenzene and also solvent mixtures in which a portion has a polar character and the other has a nonpolar character.

The monomers which can be used alone or in admixture with each other for carrying out the manufacture of thermoplastic materials modified by grafting on saturated polymers are:

1. Alkenylaromatic monomers such as styrene, alpha-methylstyrene, alpha-alkylstyrene, chlorostyrene and, in general, substituted styrenes, vinylnaphthalene and substituted vinylnaphthalenes;

2. Acrylic monomers having the general formula:

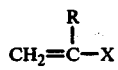

wherein: R is H or an alkyl group having from 1 to 5 carbon atoms, and X is selected from:

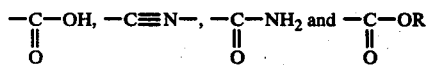

in which R is an alkyl group containing from 1 to 9 carbon atoms;

3. Vinyl monomers $CH_2=CH-X$ in which X is Cl, $OCOCH_3$ etc.

The above enumerated monomers can be used in an appropriate mixture and copolymerized simultaneously onto the elastomeric phase. The above enumerated monomers can be used, in addition, either alone or in admixture with each other or with other monomers which improve the properties of the as-produced resins, such as maleic anhydride and/or its imidic derivatives as disclosed in the U.S. patent application No. 724.602 filed on Sept. 20, 1976 and owned by the Assignee hereof, or also with unsaturated monomers which contain an epoxy group such as for example allylglycidyl ether, glycidyl acrylate and glycidyl methacrylate.

The elastomeric material used in the synthesis of the thermoplastic materials which are the subject of this invention is composed of all the polymers having a rubbery and saturated character which are capable of undergoing grafting reactions by the above enumerated monomers.

Examples of such materials are:
the copolymers based on ethylene-propylene and/or higher homologs;
the copolymers of ethylene with one or more vinyl and/or acryl monomers capable of making the polymeric chains amorphous and thus having an elastomeric character, such as for example the vinyl and acryl esters;
the polymers having an elastomeric character which are obtained with catalysts of a cationic type from alpha-olefins or mixtures of linear or branched alpha-olefins;
The hydrogenated diene rubbers such as polybutadiene and hydrogenated poly-isoprene.

Admixtures of one or more of the above enumerated elastomeric materials can also be used.

Catalysts to be used in the practice of the present invention are in general all those compounds, soluble in organic solvents, which are capable of supplying free radicals. Typical examples of such catalysts are:
the dialkylperoxides such as di-ter-butylperoxide and dicumylperoxide and others;
the diacylperoxides such as lauroylperoxide, benzoylperoxide, diacetylperoxide and others;
the per-esters such as ter-butylperbenzoate, ter-butylperpivalate, ter-butylperoctate and others;
the peracetals such as 2,2-bis-(ter-butylperoxy) butadiene and others.

As regards the use of such catalyst, the Applicants have determined the kinetic constants of addition to the double bonds, of extraction of hydrogens in allyl position to the double bonds and of extraction of hydrogen atoms from saturated hydrocarbonaceous chains for a wide range of initiator radicals.

It has thus been possible to make conspicuous the influence of the initiator radicals has on the competition between the polymer and the monomer for the reaction with the initiator radicals themselves. More particularly, a higher concentration of radicals has been observed on the chains of the polymer when the inducing radicals are radicals of the type $(CH_3)_3CO'-$.

The radicals $(CH_3)_3CO'$ have a very high affinity for the reaction of hydrogen extraction, whereas they show a certain reluctance, relative to the radical initiators of other type, for the addition to the double bond. These characteristics enhance the reactivity of the polymer while depressing that of the monomer and these latter, in practice, react by addition only.

The competition between monomers and polymers for the initiator radicals is a determining factor to the end of obtaining high yields of grafted polymer relative to the formation of free resin (by "free resin" is intended the resin which is produced by homo- or co-polymerization of the monomers and which has not been grafted onto the elastomeric matrix).

Calculations made on this base indicated a yield of grafted polymer which was definitely higher for the reactions primed by radicals $(CH_3)_3-CO'$ and, more generally, by tertiary alkoxy radicals having the general formula:

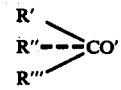

We have carried out syntheses of thermoplastic materials, starting from catalysts capable of setting free radicals of the kind referred to above and from completely saturated elastomeric chains, and the as-obtained products have actually displayed technological specifications which were definitely improved over those of the same materials produced under the same experimental conditions but with peroxides which were not capable of evolving, when decomposed by heat, radicals of the kind:

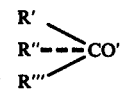

In the case of shock-resistant resins based on styrene-acrylonitrile partially grafted onto an ethylene-propylene copolymer, produced with the solution method and the procedures of incremental additions of monomers and solvent as described above, the resins in question exhibited values of impact resistance (Izod test) and grafting degrees which, when the resins were produced with $(CH_3)_3$——$CO'$ radicals rather than with radicals originated by the decomposition of benzoyl peroxide, were by 20% higher, as will be shown in the examples reported in the present specification.

Still in connection with the initiator radicals, as used for the synthesis of the thermoplastic materials claimed herein, it should be noticed that not a few of them are decomposed at temperatures which are too much in excess of those required for synthesizing materials having certain physical specifications, such as certain types of modified resins, as described in this specification and used as materials having shock-resistant properties.

In such cases, the reaction temperature can be kept at values which are comparatively low as compared with the temperature which is necessary to ensure a satisfactory decomposition velocity of the radical generators by slight additions of decomposition accelerators in such amounts as to ensure the desired concentration of radicals.

Accelerators which can be used in the synthesis reaction of shock-resistant resins according to the procedures as described in this specification are for example the tertiary amines or other organic reducing compounds such as benzoin or, more generally, alphaketols or other reducing substances having a mixed inorganic-organic character, provided that they are soluble in the solvent medium, such as for example benzenesulfinic acid. More generally, all those reducing substances can be used, which are susceptible of accelerating the peroxide decomposition velocity with a chemical mechanism which is akin to that of the redox reactions.

The decomposition velocity of the initiator radicals can also be accelerated by the presence of slight amounts of salts of low-valency heavy metals and which are soluble in the reaction medium, such as for example organic salts of bivalent iron or of trivalent vanadium.

It is also possible to accelerate the production of such radicals by acting with the redox system in which, in addition to the peroxide and the organic reducing agent (amines, ketols and others) there are active, with a synergistic action, small amounts of organic salts of heavy metals such as for example those mentioned in the foregoing.

Whenever it is desired that the reaction temperature be maintained at very low values which are rigidly constant, it is possible to resort to irradiation with ultra-violet rays which accelerate the decomposition of radical generators irrespective of the temperature which has been adopted in the resin synthesis.

In order that the advantages of the method adopted herein for the synthesis of the resins described may become fully appreciated, a comparison has been instituted between the shock-resistant resins based on styrene and acrylonitrile partially grafted on an EPM (a saturated rubber based on ethylene and propylenes) as produced, in the first case with a conventional procedure (mass-suspension) and, in the subsequent cases, with the method which provides for the dissolution of the rubber to be grafted in a solvent medium (solution). There has been selected for comparison the mass-suspension method since the difficulty of obtaining stable emulsions of elastomers based on ethylene and propylene is well known.

It will be clearly apparent from these first examples that the best combination of properties is obtained with the solution method, inasmuch as the presence of the solvent medium ensures blander reaction conditions, both because it prevents the occurrence of local overheatings, and because the distribution of the chains of grafted resin on the rubber as well as the distribution of their molecular weights is more regular than that which is obtained with other procedures in that there are no localized differentials in the concentrations of the several reactants, and the monomer diffusion does not find any hindrance in the operating phase of the reactants, contrary to what occurs in the heterogeneous-phase method.

The third and fourth examples will display the advantages which can be obtained from the versatility of the method in solution, which allows a wide choice as to the synthesizing procedure, such as for example the choice of the concentrations of the various reactants at every instant of time of the reaction, by incremental additions of the monomers and of the catalyst, and of the solvent medium as well.

Finally, the fifth example will show the improved reactivity of the catalysts which are capable of supplying, by thermal decomposition or by decomposition otherwise caused to occur such as ultra-violet radiations, redox system and the like, radicals of the type:

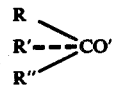

such as improved reactivity having as a consequence an increase of the number of resin chains grafted onto the elastomer and thus an improvement of the technological specifications of the as-produced resins.

EXAMPLE 1

A three-necked, half-liter flask equipped with bubble condenser, stirring mechanism and thermometer, is charged, in a nitrogen atmosphere, with 20 grams of saturated copolymer based on ethylene and propylene and having the following specifications:

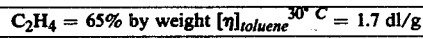

120 mls styrene are added and the mixture is stirred at room temperature unti the entire mass has passed into solution. The temperature is raised to 85° C. and 1 gram of benzoyl peroxide is added.

During 10 minutes, with vigorous stirring, a mixture is added dropwise, which consists of 30 mls acrylonitrile and 10 mls styrene. After 2 additional minutes of stirring, the mixture is cooled to room temperature and the partially polymerized reaction mass is transferred into a 1-liter autoclave, which is also charged with a solution of 1 gram of polyvinyl acetate in 250 mls distilled water, and 0.5 gram of benzoyl peroxide. The reaction is caused to proceed for 6 hours at 100° C. with vigorous stirring. The reaction product is poured in 3 liters of isopropanol, filtered and dried at room temperature in vacuo. There are obtained 161 grams of a resin, the properties of which are tabulated in TABLE 1. A resin is thus obtained, which has a comparatively high viscosity ($[\eta]^{MEK} = 0.94$), a low grafting degree and a poor resistance to shock. The low values of the grafting degree are due to the strong competition between the reaction of addition of the initiator radicals to the vinyl monomers which are present at a high concentration (mass reaction) and the reaction of attack by the initiator radicals to the elastomeric substrate to be grafted.

EXAMPLE 2

A 2-liter reactor is charged, in a nitrogen atmosphere, with 20 grams of a saturated copolymer based on ethylene and propylene and having the following specifications:

$C_2H_4 = 66\%$ by weight $$[\eta]_{30°} \, C^{toluene} = 1.92 \, dl/g$$

There are added 450 mls of petroleum ether and stirring at room temperature is applied for a time which is sufficient to have the polymer pass into solution. The polymer solution is then supplemented with 1.2 gram of benzoyl peroxide, 116 grams of styrene and reacted during 8 hours at 90° C. in a nitrogen atmosphere. The preaction product is precipitated in 3 liters of isopropanol, collected on a filter and dried at room temperature in vacuo. There are obtained 156 grams of a resin, the properties of which are tabulated in TABLE 1. It can be appreciated that the degree of grafting remains a poor one, even if the resistance to shock has slightly been improved. This is presumably attributable to a better dispersion of the rubber throughout the glassy mass, a more uniform distribution of the chains of grafted resin onto the rubber as well as a more uniform distribution of the molecular weights in the resin when obtained with the solution process, being the factors which are responsible for such an improvement. By so doing, the as-produced resin, even though it possesses a poor impact resistance, has, in general, a combination of physical properties which is improved over that of the resin of Example 1.

EXAMPLE 3

A 2-liter reactor equipped with a stirrer is charged, in a nitrogen atmosphere, with 20 grams of a saturated copolymer based on ethylene and propylene and having the following specifications:

$C_2H_4 = 65\%$ by weight $$[\eta]_{30°} \, C^{toluene} = 1.88 \, dl/g$$

There are added 70 mls of petroleum ether and stirring at room temperature is applied until the polymer has passed into solution. The mass is heated to 85° C. and there is added 1.0 gram of benzoyl peroxide, whereafter there are added, by a metering pump and during a time of one hour and a half, a solution of 63 mls styrene and 25 mls acrylonitrile in 75 mls of petroleum ether. The mass is heated with stirring to the temperature of 85° C. during 30 additional minutes, whereafter are added, by the same metering pump and during a time of 3 hours, a solution of 63 mls styrene, 25 mls acrylonitrile and 0.4 gram of benzoyl peroxide, all dissolved in 100 mls of petroleum ether. On completion of the addition, the mixture is heated for 5 additional hours to 85° C. At the sixth and the seventh hour as from the start of the reaction, there have been added to the reaction mixture 50 mls of petroleum ether. The reaction product is precipitated in 3 liters of isopropanol and dried at room temperature in vacuo. There are obtained 163 grams of a resin the properties of which are tabulated in TABLE 1. It is noted that the degree of grafting and the consequent shock-resistance properties of the material have considerably been improved over those of the resin of the preceding example and this fact shows that the conditions of the process as adopted, by making it possible to work with controlled concentrations of monomers and reactants, encourage the reaction of radicalization of the saturated elastomeric phase by the initiator radicals with respect to the reaction of addition of the same radicals to the vinyl monomers. The improved degree of grafting of the elastomeric phase, in conjunction with the even distribution of the grafted resin chains onto the elastomer, confer upon the material a combination of physical specifications which is comparable with that of the commercial ABS-resins as obtained by grafting the same monomers onto polybutadiene, but the resistance to aging has considerably been improved thereover (TABLE 2).

EXAMPLE 4

The same procedure of Example 3 is followed employing 25 grams of saturated copolymer with the same specifications as those of the polymer used in the preceding Example and with the same amounts and types of catalysts, monomers and solvent. A resin is obtained which has a higher contents of rubber than that obtained in the preceding Example. From the examination of the properties (TABLE 1) an improved shock-resistance is noticed with respect to the resin of the preceding example, and this is due to the greater contents of elastomer. TABLE 2 reports the respective resistance to aging, which is positively improved over that of the commercial ABS-resins.

EXAMPLE 5

The same procedure as in Example 3 is followed, using the same amounts of saturated copolymer and with the same properties as in Example 3. The differences with respect to Example 3 consists in the use of 1.5 mls of tert.butyl-perisononate instead of the benzoyl peroxide and in the synthesis temperature which has been raised to 95° C. There are obtained 167 grams of a resin the technological properties of which are tabulated in TABLE 1. The result show the improved reactivity of the tert.butoxy radicals which is reflected in a better yield of grafting and higher values of the anti-shock properties.

EXAMPLE 6

A 2-liter reactor equipped with stirrer is charged, in a nitrogen atmosphere, with 20 grams of a saturated copolymer based on ethylene and propylene and having the following specifications:

$C_2H_4 = 61.5\%$ by weight $$[\eta]_{30°} \, C^{toluene} = 1.98 \, dl/g$$

There are added 70 mls of a mixture of equal volumes of toluene and heptane and stirring is continued for a time which is sufficient to have the polymer passed in solution. There are added 20 grams of a mixture of styrene and acrylonitrile in the weight ratio of 3:1 along with 1,3-grams of tert.butyl-peroctoate. The mixture is heated to 90° C. and there are added, in increments during 6 hours 130 grams of the same mixture of styrene and acrylonitrile. Starting from the first hour there are added, by means of another metering pump and during a time of 5 hours, 200 mls of the toluene and heptane mixture. On completion of such an addition, the mixture is heated to 90° C. during 3 additional hours. By precipitation in isopropanol and drying, there are recovered 152 grams of a resin the properties of which are tabulated in TABLE 1.

EXAMPLE 7

A four-necked 3-liter flask equipped with stirrer, thermometer and bubble condenser is charged in a nitrogen atmosphere with 30 grams as a saturated copolymer based on ethylene and propylene having the same characteristics of the copolymer used for Example 6 and there are added 300 mls of a mixture of equal volumes of toluene and heptane and stirring at room temperature is continued until the copolymer has passed into solution. There are added 200 mls. of a 3:1 by weight ratio mixture of styrene and acrylonitrile and 1.5 grams of tert.butylperbenzoate. The mixture is heated to 85° C. and irradiated discontinuously with a low-pressure immersion mercury vapor lamp having the power of 200 watts and a quartz sleeve. The irradiation pulsations have been so adjusted as to obtain a 90% conversion of the resin within a time of 6 hours. After six hours there are recovered by precipitation from isopropanol and drying, 190 grams of a material the properties of which are tabulated in TABLE 3.

EXAMPLE 8

The same procedure as in Example 7 is followed with the same pulsation frequency in the irradiation run. The modifications lie in that the monomers styrene and acrylonitrile have been fed during a time of 4 hours, and in the duration of the reaction which has now been 8 hours. There have been recovered 195 grams of a material the properties of which are tabulated in TABLE 3.

EXAMPLE 9

A 2-liter reactor equipped with stirrer is charged in a nitrogen atmosphere, with 20 grams of a saturated copolymer based on ethylene and propylene and having the following specifications:
$C_2H_4 = 61\%$ by weight $$[\eta]_{30}\cdot c^{toluene} = 1.8\ dl/g$$

There are added 70 mls of petroleum ether and stirring at room temperature is applied until the whole copolymer has passed into solution. There are added 1.5 grams of tert.butylperbenzoate and 0.3 gram of benzoin. The mass is heated to 85° C. and there are added during 6 hours 160 grams of a mixture (3:1 on a weigh basis) of styrene and acrylonitrile. Starting from the second hour there are added during the above indicated 6-hour interval, 200 mls. of petroleum ether. The overall reaction time is 10 hours at 85° C. There are recovered by precipitation from isopropanol and drying in vacuo, 142 grams of a resin the properties of which are tabulated in TABLE 3.

EXAMPLE 10

A 2-liter reactor is charged with 20 grams of a copolymer based on ethylene and propylene having the following specifications:
$C_2H_4 = 61\%$ by weight $$[\eta]_{30}\cdot c^{toluene} = 2.03\ dl/g$$

There are added 70 mls of toluene and stirring is applied at room temperature until the whole copolymer has passed into solution. There are added 1.3 gram of tert-.butylperbenzoate, 0.5 gram of benzoin and 0.05 gram of iron (ferric) acetylacetonate. The mass is heated to 85° C. and there are added during 4 hours 150 grams of methylmethacrylate, diluted in 200 mls of petroleum ether. On completion of the addition, the mass is heated to 85° C. during 6 additional hours. There are recovered by precipitation from isopropanol and drying in vacuo, 154 grams of a resin, the properties of which are tabulated in TABLE 3.

EXAMPLE 11

A four-necked, 2-liter flask equipped with a bubble condenser, thermometer and stirrer, is charged, in a nitrogen atmosphere, with 15 grams of a saturated copolymer based on ethyelene and propylene and having the following specifications:
$C_2H_4 = 61\%$ by weight $$[\eta]_{30}\cdot c^{toluene} = 2.01\ dl/g$$

There are added 70 mls of a mixture of 50 parts by volume of toluene and 50 parts by volume of nor.heptane and stirring at room temperature is applied until the copolymer has entirely passed into solution. The solution is then supplemented with 1.3 gram of tert. butylperoctoate and heated to 90° C. There are added, during 4 hours, 156 mls of a 3:1 by weight. mixture of styrene and acrylonitrile together with 15 grams of N-phenyl-maleimide and 300 mls of a toluene and heptane mixture. On completion of the addition, the mixture is heated during 4 additional hours to 90° C. There are recovered by precipitation from isopropanol and drying in vacuo, 170 grams of a resin the properties of which are tabulated in TABLE 3.

EXAMPLE 12

Example 11 is repeated using 70 mls of a 1:1 by weight mixture of toluene and heptane to dissolve the copolymer, whereas for the addition of the residual solvent during the reaction time there have been used 200 mls of a 1:1 by wt. mixture of toluene and ethyl acetate. There are recovered 159 grams of a material the properties of which are tabulated in TABLE 3.

EXAMPLE 13

A four liter flask equipped with a stirrer, a reflux condenser and a thermometer, is charged, in a nitrogen atmosphere, with 15 grams of a copolymer based on ethylene and propylene having the following specifications:
$C_2H_4 = 61\%$ by weight $$[\eta]_{30°C}^{toluene} = 1.3 \text{ dl/g}$$

There are added 70 mls toluene and stirring is applied at room temperature until the polymer has passed into solution. The solution is then supplemented with 1.8 gram of tert.butylperoctoate and heated to 95° C. There are added, during 4 hours, 120 mls of methylmethacrylate. Starting from the second hour, there are added, during 4 hours, 300 mls of toluene. Once also the second addition is completed, heat is applied to 95° C. during 2 additional hours. On completion of the reaction, the mixture is cooled at room temperature and is diluted with 3 liters of toluene. A sort of lacquer is thus obtained. A few samples, obtained from commercial ABS have been dipped in this lacquer. A protective layer of about 30-micron thickness of resin is thus formed, as produced according to this Example, on the ABS plates. The protected samples have been subjected to artifical ageing in a Weather-o-meter. The results of the ageing test have been reported in TABLE 4 in comparison with those of samples of ABS-resin, such as ABS coated with a polymethylmetacrylate film. As can be seen, coupling the resin with a pure acrylic film coating protects the ABS resin from yellow discoloration, but, at the same time, it brings about an overall embrittlement of the particularly resistant material in the case in which the shock is experienced on the coated surface. In the case in which the rigidity modulus of the protective film is similar to that of the ABS resin such as in the case of the lacquer of the material prepared by us, the shock resistance of the resin as such is little modified and remains high, as an average, during ageing.

EXAMPLE 14

A 2-liter reactor is charged, in a nitrogen atmosphere, with 15 grams of a copolymer based on ethylene and vinyl acetate containing 80% by weight of ethylene (melt index 9 g/10 mins.). There are added 70 mls toluene and stirring at room temperature is continued until the whole polymer has passed into solution. There are added 1.3 grams of benzoyl peroxide and the mass is heated to 85° C. There are added, during 3 hours, 156 grams of a 3:1 by wt. mixture of styrene and acrylonitrile together with 250 mls of a 3:1 by vol. mixture of heptane and toluene. On completion of the latter addition, the mass is heated during 5 additional hours to 85° C. There are obtained, by precipitation from isopropanol and drying at 50° C. in a vacuo, 152 grams of a material the properties of which are tabulated in TABLE 3.

EXAMPLE 15

The procedure of Example 14 is repeated with 20 grams of poly-isobutylene having a [η] in cyclohexane at 30° C. of 1.9 dl/g. There are recovered 151 grams of a material the properties of which are tabulated in TABLE 3.

EXAMPLE 16

A four-necked 2-liter flask equipped with a stirrer, a reflux condenser and a thermometer, is charged, in a nitrogen atmosphere with 20 grams of a saturated copolymer based on ethylene and propylene and having the following specifications:

$C_2H_4 = 61\%$ by weight $$[\eta]_{30°C}^{toluene} = 1.8 \text{ dl/g}$$

There are added 70 mls toluene and stirring at room temperature is continued until the whole rubber has passed into solution. There are added 1.5 grams of tert-.butyl peroctoate and the mixture is heated to 85° C. By means of a peristaltic pump there is added during 5 hours a solution of 150 grams of methylmethacrylate in 150 mls toluene. Starting from the third hour there are added, by means of a second peristaltic pump and during four hours, 300 mls of toluene. On completion of the additions, heat is applied for one additional hour at a temperature of 85° C. By precipitation from ethanol and drying in vacuo there are recovered 150 grams of a material having good antishock properties (Izod impact test = 25 kilograms per cm/sq. centimeter), a high stiffness (Modulus E = 27,000 kilograms/sq.centimeter) and a high degree of light transmittance (% transmittance according to ASTM D-1003 = 90%). By extraction of the free resin there are obtained 35 grams of a product which correspond to a degree of grafting of 80. The satisfactory transparency as displayed by these materials is probably due to the concurrence of two factors, viz.:

- the particular morphology of the grafted elastomeric phase, which is finely dispersed throughout the resinous matrix, and
- the slight difference in the values of the refractive indices of the saturated copolymer and the resinous matrix, respectively.

The measurements taken on the reaction products, and the results of which are tabulated in the TABLES have been performed according to the following standards:

Izod impact test according to ASTM D-256, notched sample;

Impact test with an unnotched sample on samples of ½ in. by ⅛ in. The samples are struck on the wider surface exposed to ageing;

flexural modulus (E) according to ASTM D-790;

flow rate according to ASTM D-1238 (load 10 kilograms)

yellowness index according to ASTM D-1925.

The accelerated ageing test under ultraviolet radiations has been carried out in an Atlas DMC-n-Weather-o-meter with a double carbon arc source, full light power.

Temperature of the black panel: 63° C.

Relative humidity: 50%

The mechanical properties have been determined after the homogeneization of the resins on an open roll mill (roll temperature 180° C.) and the addition thereto of 1 ph of Bayer's BKF antioxidant (2,2'-methylene-bis-(4-methylbutylphenol).

Compression molding was carried out at 200° C. under a pressure of 40 kilogram/sq.centimeter.

TABLE 1

| Example | % rubber | $G[\eta]_{SAN}$(°°) (°) | (dl/g) | Izod Impact kg.cm sq.cm | Modulus (E) kg/ sq.cm. | Flow Rate at 200° C 10 kg Load g/10 mins. |
|---|---|---|---|---|---|---|
| 1 | 12.4 | 14 | 0.94 | 3 | 26.000 | 0.3 |
| 2 | 12.85 | .16 | 0.75 | 6 | 25.700 | 0.8 |
| 3 | 12.25 | 35 | 0.7 | 12 | 26.200 | 0.9 |
| 4 | 15 | 34 | 0.65 | 16 | 23.000 | 0.8 |
| 5 | 12 | 60 | 0.63 | 25 | 26.000 | 0.7 |

TABLE 1-continued

| Example | % rubber | G[η]$_{SAN}$(°°) (°) | Izod Impact kg.cm (dl/g)sq.cm | Modulus (E) kg/ sq.cm. | Flow Rate at 200° C 10 kg Load g/10 mins. |
|---|---|---|---|---|---|
| 6 | 13.1 | 55 | 0.5  20 | 23.000 | 1.3 |

(°) G = $\frac{\text{grams bound resin}}{\text{grams of rubber}} \cdot 100$ (°° [η]$_{SAN}$ = intrinsic viscosity, as determined in methyl-ethyl-ketone at 30° C.

TABLE 2

Accelerated ageing in an ATLAS DMC-WEATHER-0-METER
% Retention of the resistance to impact on unnotched samples (U)
Yellowness index (Y.I.) as a function of the ageing time

| Examples time,hours | ABS U. (Y.I.) | 3 U. (Y.I.) | 4 U. (Y.I.) | 5 U. (Y.I.) |
|---|---|---|---|---|
| 0 | 100 - 30 | 100 - 20 | 100 - 18 | 100 - 18 |
| 150 | 10 - 40 | 100 - 19 | 100 - 17 | 100 - 16 |
| 1000 | 3 - 70 | 87 - 21 | 83 - 17 | 86 - 17 |

TABLE 3

| Example | % Rubber | G[η]$_{SAN}$ dl/g | Izod Impact kg/cm sq.cm. | Modulus (E) kg/ sq.cm. | Flow Rate at 200° C 10 kg load grams/ 10 mins. |
|---|---|---|---|---|---|
| 7 | 15.8 | 35 | 0.52 | 17 | 19.000 | 1 |
| 8 | 15.4 | 62 | 0.55 | 32 | 22.500 | 0.7 |
| 9 | 14.1 | 58 | 0.48 | 25 | 23.700 | 1.5 |
| 10 | 13 | 40 | 0.4 | 20 | 12.000 | 4 |
| 11 | 9 | — | — | 12 | 28.000 | 0.5 |
| 12 | 9.45 | — | — | 11 | 27.000 | 1.3 |
| 14 | 9.9 | — | — | 14 | 27.500 | 5 |
| 15 | 9.3 | 15 | 0.7 | 5 | | 4.8 |

TABLE 4

Accelerated ageing in an ATLAS DMC WEATHER-O-METER
Impact resistance on unnotched samples (U.) *)
Yellowness Index (Y.I.) as a function of the ageing time.

| time, hours | ABS(1) U. kg.cm | Y.I. | ABS(2) U. kg.cm sq.cm | Y.I. | ABS(3) U. kg.cm sq.cm | Y.I. |
|---|---|---|---|---|---|---|
| 0 | 40 | 30 | 8 | 31 | 35 | 31 |
| 200 | 4 | 40 | 8 | 30 | 25 | 31 |
| 500 | 3 | 60 | 7 | 32 | 27 | 33 |
| 1000 | 3 | 70 | 3 | 34 | 20 | 36 |

(*) the test is performed by striking the samples (½in.by ¼ in.) on the wide surface which has been exposed to ageing.
(1) commercially available ABS
(2) commercially available ABS coated by a polymethylmetacrylate film
(3) commercially available ABS treated as in Example 13.

We claim:

1. A thermoplastic material comprised of:
   (a) a resinous phase obtained by polymerizing a member of the group consisting of alkeny aromatic monomers, acrylic monomers having the general formula:

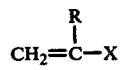

wherein R is H or an alkyl group having from 1 to 5 carbon atoms and X is a member of the group consisting of

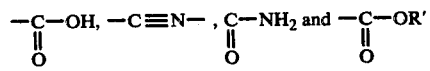

wherein R' is an alkyl group having from 1 to 9 carbon atoms, vinyl monomers having the general formula $CH_2 = CH - X'$ wherein X' is Cl or $-OCOCH_3$, maleic anhydride, imidic maleic anhydride, unsaturated monomers containing an epoxy group, and mixtures thereof; and
   (b) a saturated elastomeric phase obtained by admixing at least two members of the group consisting of copolymers of ethylene with at least one linear or branched ethylene homolog and having grafted thereon at least one member of the resinous phase of group (a).

2. Thermoplastic material as claimed in claim 1, wherein said saturated elastomeric phase is present in an amount in the range of from 5 to 95 percent by weight, the balance being composed of said free resinous phase and said grafted resinous phase.

3. Thermoplastic material as claimed in claim 1, wherein each part of said grafted elastomeric phase contains in the grafted condition from 5 to 200 parts by weight of of at least one member of the resinous phase of group (a).

4. The method of preparing a thermoplastic material which comprises dissolving in a hydrocarbon solvent a saturated elastomeric phase obtained by admixing at least two members of the group consisting of copolymers of ethylene with at least one linear or branched ethylene homolog and a member of the group of monomers consisting of alkenyl aromatic monomers, acrylic monomers having the general formula:

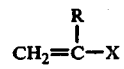

wherein R is H or an alkyl group having from 1 to 5 carbon atoms and X is a member of the group consisting of

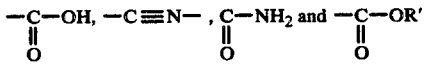

wherein R' is an alkyl group having from 1 to 9 carbon atoms, vinyl monomers having the general formula $CH_2 = CH - X'$ wherein X' is Cl or $-OCOCH_3$, maleic anhydride, imidic maleic anhydride, unsaturated monomers containing an epoxy group, and mixtures thereof, and polymerizing said monomers and grafting them onto said saturated elastomeric phase in the presence of a radical initiator.

5. A method for the preparation of thermoplastic material as claimed in claim 4, wherein said monomer or mixture of monomers to be grafted onto the saturated elastomeric phase is added incrementally to the reaction mixture as the reaction progresses.

6. A method for the preparation of thermoplastic material as claimed in claim 4, wherein the reaction temperature is in the range of from 30° C. to 150° C.

7. A method for the preparation of thermoplastic material as claimed in claim 4, wherein the radical initiator is a member of the group consisting of the organic peroxides, the hydroperoxides, the peresters and peracetals, the percarboxylic acids, the percarbonates and mixtures thereof.

8. A method for the preparation of thermoplastic material as claimed in claim 7, wherein decomposition of the radical initiator or of the admixture of two or more initiators is activated by ultraviolet radiations.

9. A method for the preparation of thermoplastic material as claimed in claim 7, wherein decomposition of the radical initiator or of the mixture of two or more initiators is activated by reducing organic substances.

10. A method as claimed in claim 9, wherein said reducing substance is a member of the group consisting of the aliphatic amines and the aliphaticaromatic amines.

11. A method according to claim 9, in which the reducing substance is an alpha-hydroxyketone.

12. A method for the preparation of thermoplastic material as claimed in claim 7, wherein the radical initiator, or the mixture of two or more initiators, is activated during said polymerization by organic salts of transition metals in a valency state below the maximum possible valency, said salts being soluble in the reaction medium.

13. A method as claimed in claim 4, wherein said solvent is selected from the group consisting of liquid aliphatic, aromatic, naphthenic, alkyl-aromatic, alkyl- and aryl-naphthenic hydrocarbons, compounds having a polar character, and admixtures thereof.

* * * * *